(12) United States Patent
Booker

(10) Patent No.: US 12,427,076 B2
(45) Date of Patent: Sep. 30, 2025

(54) DENTAL CARE SYSTEMS AND METHODS

(71) Applicant: BRUSHTIME ENTERPRISES, LLC, Owings Mills, MD (US)

(72) Inventor: Winifred J. Booker, Owings Mills, MD (US)

(73) Assignee: BRUSHTIME ENTERPRISES, LLC, Owings Mills, MD (US)

( * ) Notice: Subject to any disclaimer, the term of this patent is extended or adjusted under 35 U.S.C. 154(b) by 821 days.

(21) Appl. No.: 17/710,466

(22) Filed: Mar. 31, 2022

(65) Prior Publication Data

US 2022/0218548 A1     Jul. 14, 2022

Related U.S. Application Data

(63) Continuation-in-part of application No. 16/418,701, filed on May 21, 2019, now Pat. No. 11,297,931.

(60) Provisional application No. 63/173,099, filed on Apr. 9, 2021, provisional application No. 62/729,831, filed on Sep. 11, 2018, provisional application No. 62/674,887, filed on May 22, 2018.

(51) Int. Cl.
| | |
|---|---|
| *A61G 15/00* | (2006.01) |
| *A47C 7/62* | (2006.01) |
| *A61G 15/02* | (2006.01) |
| *A61G 15/10* | (2006.01) |
| *A61G 15/16* | (2006.01) |
| *G09B 23/28* | (2006.01) |

(52) U.S. Cl.
CPC ........... *A61G 15/105* (2013.01); *A61G 15/02* (2013.01); *A61G 15/16* (2013.01); *A47C 7/626* (2018.08); *G09B 23/283* (2013.01)

(58) Field of Classification Search
CPC ....... A61G 15/105; A61G 15/16; A47C 7/626
USPC ........................................ 297/188.08–188.13
See application file for complete search history.

(56) References Cited

U.S. PATENT DOCUMENTS

| | | | | |
|---|---|---|---|---|
| 1,828,470 | A | * 10/1931 | Monnot | A61G 15/105 |
| | | | | 297/423.18 |
| 2,044,992 | A | * 6/1936 | May | A61G 15/105 |
| | | | | 297/423.25 |
| 2,738,168 | A | * 3/1956 | Mcbride | A61G 15/105 |
| | | | | 297/254 |

(Continued)

FOREIGN PATENT DOCUMENTS

| | | | | |
|---|---|---|---|---|
| CN | 112245212 A | * | 1/2021 | ............. A61B 90/14 |
| CN | 112603740 A | * | 4/2021 | ......... A61B 5/15003 |

(Continued)

*Primary Examiner* — Rodney B White

(74) *Attorney, Agent, or Firm* — HAYNES AND BOONE, LLP

(57) ABSTRACT

A system and method according to which dental care is provided to a young child or infant using a baby dental chair, a floss dispenser, and/or a dental care apparatus. The baby dental chair is specifically designed for the needs of a young child or an infant during a dental examination. The baby dental chair includes a tower base, a seat, and a plurality of wheels. At least one wheel of the plurality of wheels has two configurations: a wheel locked configuration to prevent the baby dental chair from moving and a wheel released configuration to enable the baby dental chair to move. The baby dental chair provides a safe and secure place to examine the teeth of young children or infants during a dental examination.

9 Claims, 11 Drawing Sheets

(56) References Cited

U.S. PATENT DOCUMENTS

| | | | | |
|---|---|---|---|---|
| 2,751,967 | A * | 6/1956 | Sitterley | A47D 1/103 297/331 |
| 5,290,058 | A * | 3/1994 | Adams | A61G 12/001 280/47.35 |
| 5,829,826 | A * | 11/1998 | Ziccardi | B62B 7/145 297/118 X |
| 6,793,232 | B1 * | 9/2004 | Wing | A61G 7/1067 297/188.11 X |
| 6,824,149 | B1 * | 11/2004 | Whitlock | B25H 5/00 297/118 X |
| 6,860,495 | B2 * | 3/2005 | Williamson | A61G 7/0528 280/304.5 |
| 7,273,215 | B1 * | 9/2007 | Smith | B25H 3/028 280/47.35 |
| 7,513,000 | B2 * | 4/2009 | DeBraal | A61G 13/06 297/411.31 |
| 7,562,883 | B2 * | 7/2009 | Livengood | A61H 3/04 280/43.24 |
| 7,594,668 | B2 * | 9/2009 | Arceta | A61G 12/001 280/47.35 |
| 7,845,033 | B2 * | 12/2010 | DeBraal | A61G 13/06 5/613 |
| 8,210,548 | B1 * | 7/2012 | Agyemang | A61B 50/13 280/47.35 |
| 8,474,835 | B1 * | 7/2013 | Rossi | B62B 3/02 280/47.35 |
| 8,695,996 | B2 * | 4/2014 | Janick | B60B 33/0049 280/47.35 |
| 8,844,951 | B2 * | 9/2014 | De Jong | B62B 3/10 361/679.01 |
| 2013/0049414 | A1 * | 2/2013 | Miller | A47C 7/626 297/188.09 |
| 2018/0021104 | A1 * | 1/2018 | Duncan | A61C 1/0046 433/29 |

FOREIGN PATENT DOCUMENTS

| | | | | |
|---|---|---|---|---|
| CN | 112972191 | A * | 6/2021 | A61F 5/3792 |
| CN | 113289126 | A * | 8/2021 | A61G 15/02 |
| CN | 118141650 | A * | 6/2024 | A61G 15/02 |

* cited by examiner

DENTAL CARE SYSTEMS AND METHODS

CROSS-REFERENCE TO RELATED APPLICATIONS

This application is a continuation-in-part of U.S. patent application Ser. No. 16/418,701 (the "'701 Application"), filed May 21, 2019, the entire disclosure of which is hereby incorporated herein by reference. The '701 Application claims the benefit of the filing date of, and priority to, U.S. Patent Application No. 62/674,887, filed May 22, 2018, the entire disclosure of which is hereby incorporated herein by reference. The '701 Application also claims the benefit of the filing date of, and priority to, U.S. Patent Application No. 62/729,831, filed Sep. 11, 2018, the entire disclosure of which is hereby incorporated herein by reference.

This application also claims the benefit of the filing date of, and priority to, U.S. Patent Application No. 63/173,099, filed Apr. 9, 2021, the entire disclosure of which is hereby incorporated herein by reference.

This application is related to U.S. patent application Ser. No. 12/981,222, filed Dec. 29, 2010, the entire disclosure of which is hereby incorporated herein by reference.

BACKGROUND

The present disclosure relates in general to dental care and, in particular, dental care systems and methods for providing comprehensive dental care to babies and young children.

DETAILED DESCRIPTION

Figure 1:
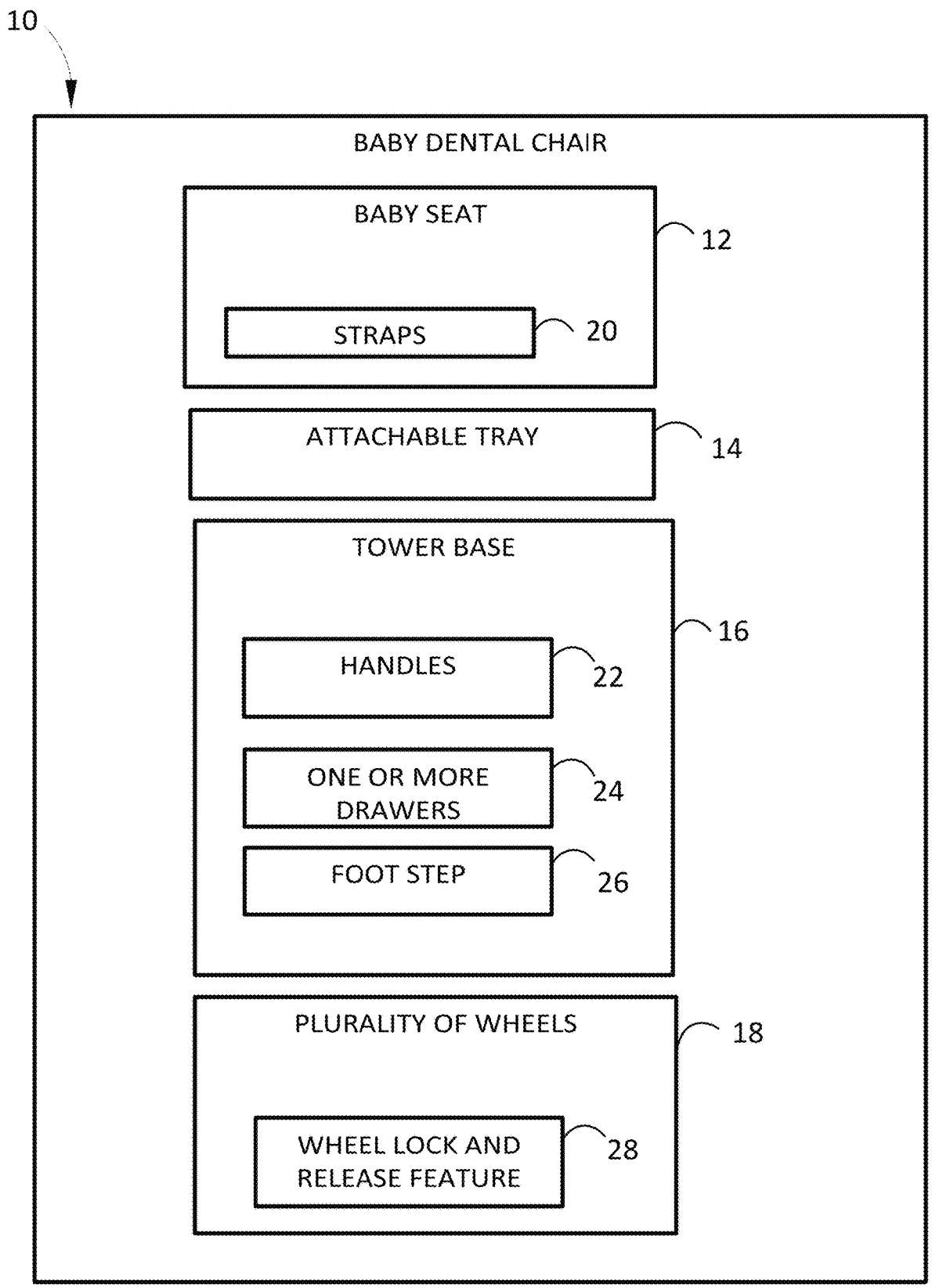
FIG. 1 is a diagrammatic illustrations of a baby dental chair, according to one or more embodiments of the present disclosure.

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a baby dental chair is generally referred to by reference numeral 10 and includes a baby seat 12, an attachable tray 14, a tower base 16, and a plurality of wheels 18. The baby seat 12 is operably coupled to the tower base 16. The attachable tray 14 is operably attached to the tower base 16, and the wheels 18 are operably coupled to the bottom of the tower base 16. The baby dental chair 10 allows a patient, who is a baby or a young child, such as a toddler, to experience a first-time dental examination in an environment familiar to them and provides the safety and accessibility required to conduct a dental examination on the patient.

In some embodiments, the baby dental chair 10 may be the same height as a dining chair (e.g., between 0.4-0.45 m).

The baby seat 12 is an oval shape. In some embodiments, the baby seat 12 is in the shape of a bowl, in an oblong shape, and/or in the shape of a half-bubble. The baby seat 12 is manufactured using injection molded plastic. In some embodiments, Microban® or a similar antibacterial plastic is used. In some embodiments, the baby seat 12 may have a fabric cushion or include fabric.

In one or more embodiments, the baby seat 12 further includes straps 20. The straps 20, in one or more embodiments, are adjustable. In some embodiments, the straps 20 are attached to the baby seat 12. In other embodiments, the straps 20 are attached to the tower base 16.

In some embodiments the attachable tray 14 is attached to the tower base 16. The attachable tray 14 in some embodiments may be releasably connected to the tower base 16. In one or more embodiments, the attachable tray 14 is a flat surface. In other embodiments, the attachable tray 14 includes recesses formed therein in the shapes of circles and/or squares. In some embodiments, the attachable tray 14 uses a notching system to move the tray closer or further away from the dental patient. In some embodiments, the attachable tray 14 is adjustable. In some embodiments, the attachable tray 14 is an educational tray. In some embodiments, the attachable tray 14 includes graphics, educational material, or educational decals on the surface of the attachable tray 14. In some embodiments, the attachable tray 14 may be sized to support a food plate, such as a food plate in the shape of a tooth. In some embodiments, the attachable tray 14 may be a USDA food plate with, for example, different compartments for different food types. In some embodiments, the attachable tray 14 is used to support the baby's favorite food, permitting a proper dental examination and/or teeth cleaning. In some embodiments, the attachable tray 14 is used to engage the baby's natural inclination to open their mouth to laugh and/or eat to help facilitate a proper dental examination. In some embodiments, the attachable tray 14 is permanently affixed to the tower base 16. In some embodiments, the infant or young child is not disturbed or is at least, less disturbed, by the dental examination and/or teeth cleaning, and thus the infant or young child is less resistant to the procedure(s).

The tower base 16 includes handles 22, one or more drawers 24, and a foot step 26. In one or more embodiments, the handles 22, drawers 24, and/or the foot step 26 may not be included in the tower base 16. In some embodiments, the handles 22 are operably coupled to the tower base 16. In some embodiments, there are a plurality of handles 22. In other embodiments, there is only a singular handle. In some embodiments, the drawers 24 are operably coupled to the tower base 16. The drawers 24, in one or more embodiments, provide storage space for dental instruments, toothbrushes, dental floss, and the like. In some embodiments, two or more drawers of the one or more drawers 24 are in the tower base 16. In some embodiments, the one or more drawers 24 are in the front of the tower base 16, and in other embodiments, the one or more drawers 24 are in the back of the tower base 16. In some embodiments, the drawers 24 are in the front and the back of the tower base 16. In some embodiments, the one or more drawers 24 are below the foot step 26. In some embodiments, the foot step 26 is integrally formed in the tower base 16. In other embodiments, the foot step 26 is a separate component attached to the tower base 16. The foot step 26 defines one or more surfaces on which the feet of the infant/young child may rest. In some embodiments, the foot step 26 acts as a foot rest for when the infant/young child is seated in the baby seat 12. In other embodiments, the foot step defines one or more surfaces that the young child may use to place their foot on to the surface to help them get seated in the baby seat 12. In some embodiments, the tower base 16 is hollow in the center. In other embodiments, the tower base 16 is solid in the center, except for where the one or more drawers 24 are located. In some embodiments, the tower base 16 has a recess at the bottom of the tower base 16 to accommodate the plurality of wheels 18.

The plurality of wheels 18 are operably coupled to the tower base 16. In some embodiments, the baby dental chair 10 further includes a wheel lock and release feature 28, which may lock the wheels 18 so that the baby dental chair 10 cannot move. In some embodiments, the plurality of wheels 18 may be retractable. In other embodiments, the plurality of wheels 18 may be non-retractable. In some embodiments, the plurality of wheels 18 retract and the tower base 16 touches the floor, which is considered the wheel lock and release feature 28. In other embodiments, the wheel lock and release feature 28 may include a foot press, button, or other device that when pressed, clicked, or otherwise selected, the plurality of wheels 18 lock. In some embodiments, the wheel lock and release feature 28 is operably coupled to the tower base 16 and/or the plurality of wheels 18. In other embodiments, the baby dental chair 10 includes the plurality of wheels 18 that are retractable and an additional wheel lock and release feature 28.

The baby dental chair 10 may be made entirely from plastic. In some embodiments, the entire baby dental chair 10 is constructed out of a plastic that includes an antimicrobial additive that can be integrated during the manufacturing process to provide a built-in, permanent layer of protection against bacteria, fungus, mold, and mildew. In some embodiments, the baby dental chair is made from Microban® type of plastic or another antimicrobial plastic or polymer. Plastic may be used for the baby dental chair 10 for ease of cleaning. In some embodiments, the baby dental chair 10 is designed to fit a baby, whose first teeth have erupted, which could be as early as six months of age. In some embodiments, the baby dental chair 10 is designed to accommodate a young child such as a toddler. In other embodiments, the baby dental chair 10 is not designed for infants and toddlers, but instead the baby dental chair 10 is sized to accommodate grown adults who have a variety of disabilities who would benefit from the baby dental chair 10 described herein.

In operation, with continuing reference to FIG. 1, a dentist may move the baby dental chair 10 to the proper location for the dental examination by using the handles 22 of the tower base 16 and the plurality of wheels 18. The patient may then be placed in the baby seat 12 and secured by the straps 20. This will allow for the patient to sit well for several minutes without support, experiencing a child-friendly adaptation to dental care. Therefore, the patient is safe and secure for a proper dental examination. The patient may rest their feet on the foot step 26 to provide further comfort to the young child.

Figure 2A:
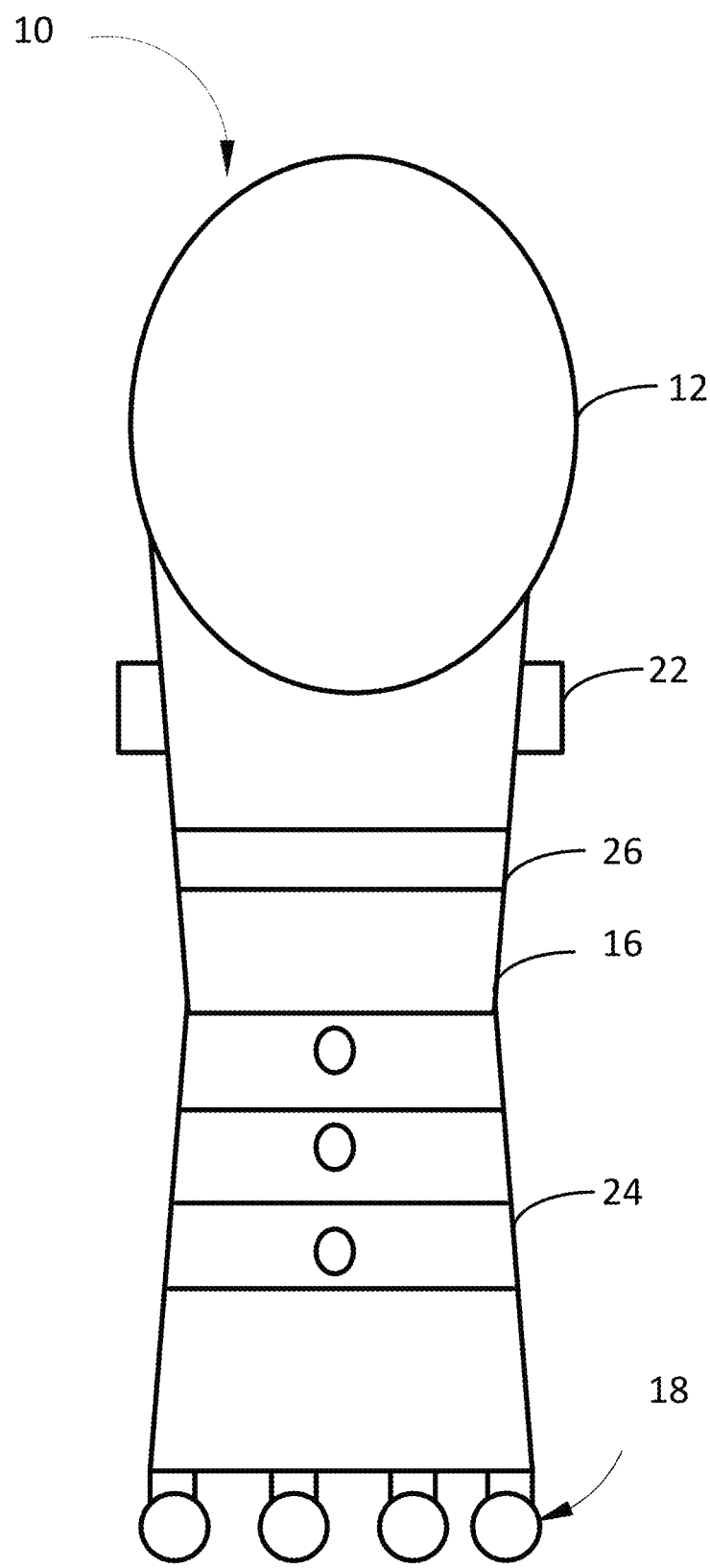
FIG. 2A is a schematic illustration of the baby dental chair of FIG. 1, according to one or more embodiments of the present disclosure.
Figure 2B:
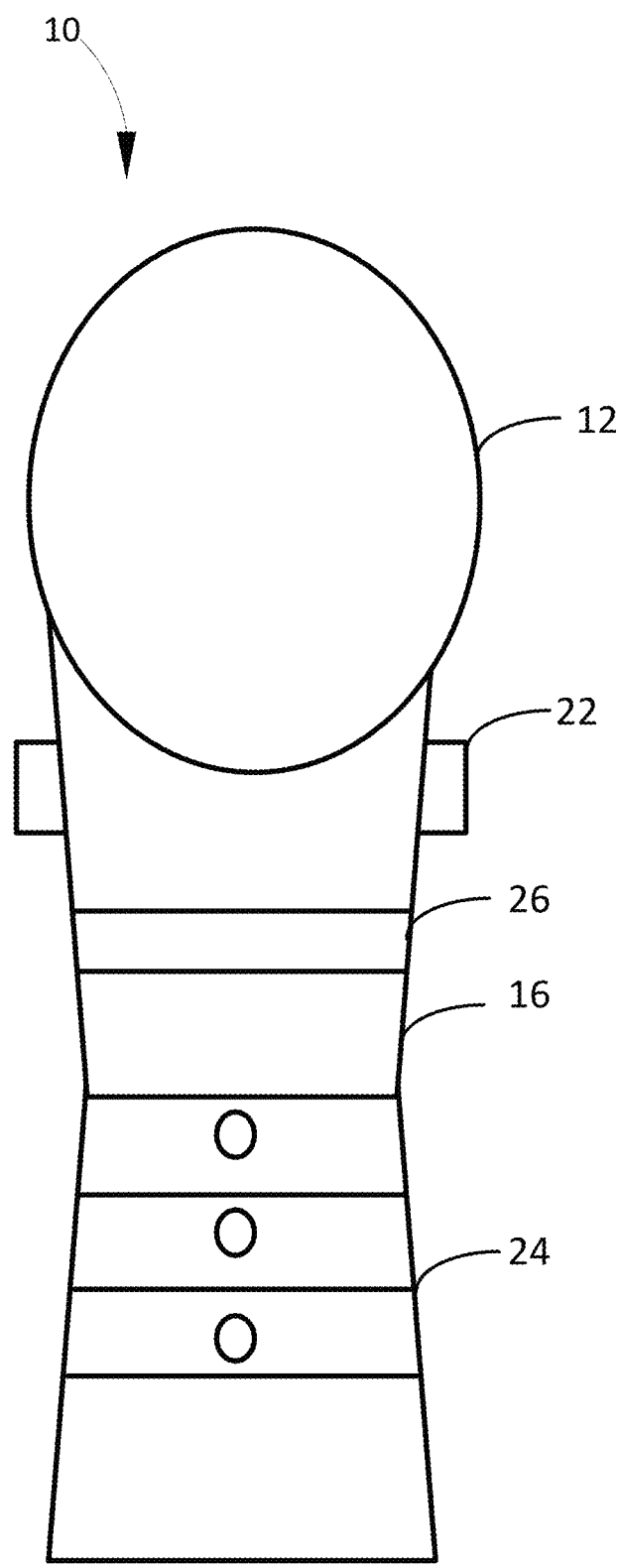
FIG. 2B is another schematic illustration of the baby dental chair of FIG. 1, according to one or more embodiments of the present disclosure.

Referring to FIGS. 2A and 2B, as an example of two configurations of the wheel lock and release feature 28 with respect to the baby dental chair 10, the wheels 18 are shown: in (1) a wheel released configuration and (2) a wheel locked configuration, respectively. In FIG. 2A, the plurality of wheels 18 are not in a locked position, instead the plurality of wheels 18 are able to move the baby dental chair 10 around a flat surface and are therefore in a wheel release configuration. In FIG. 2B, the plurality of wheels 18 are in a wheel lock configuration because the wheels are locked and unable to turn. In FIG. 2B, the plurality of wheels 18 have retracted inside the tower base 16 and are no longer visible. When the patient sits in the baby seat 12 or enough weight and/or pressure is applied on the baby seat 12, the plurality of wheels 18 retract into the tower base 16, the tower base 16 in response touches the ground, so that the baby dental chair 10 may not move (i.e., the plurality of wheels 18 are locked from rolling). This is an example of a wheel locked configuration of the wheel lock and release feature 28. When the patient is removed from the baby seat 12, the plurality of wheels 18 unlock and extend from under the tower base, and the dental chair resumes to the FIG. 2A position, which is the wheel released configuration.

The attachable tray 14 is then placed in front of the patient and secured to the tower base 16. The dentist may reach into one or more of the drawers 24 to get dental equipment such as floss, dental instruments, and the like to begin the dental examination.

The baby seat 12 may be adjustable using a notching system to provide a transition between at least three different seat position options, including 90°, 135°, and 180° options. In some embodiments, the entire baby seat 12 moves due to the notching system. In other embodiments, only a portion of the baby seat 12, such as the back of the baby seat 12, moves between the three different seat position options. The 180° degree option provides additional benefit to extract a tooth from the infant/young child from the baby dental chair 10 should an emergency arise, where the infant/young child needs to be treated in a supine position. In some embodiments, the baby seat 12 is adjustable in more than three seat position options. In some embodiments, the baby seat 12 is adjustable in less than three seat position options. In some embodiments, the baby seat 12 rotates, swivels, slides, reclines, or any combination thereof, relative to the remainder of the baby dental chair 10. In some embodiments, the baby seat 12 tilts back and forth, relative to the remainder of the baby dental chair 10. In some embodiments, the baby seat 12 rotates and/or swivels 360 degrees and tilts back and forth, relative to the remainder of the baby dental chair 10. In some embodiments, the tilt position, recline position, swivel position, slide position, or any combination thereof, of the baby seat 12 is/are manually adjustable. In some embodiments, the baby seat 12 is motorized, and thus the tilt position, recline position, swivel position, slide position, or any combination thereof, of the baby seat 12 is/are adjustable using one or more motors that are operably coupled to the baby seat 12. In some embodiments, the dentist may swivel, rotate, or adjust the baby seat 12 to move the infant/young child rather than moving the baby dental chair 10.

Figure 3:
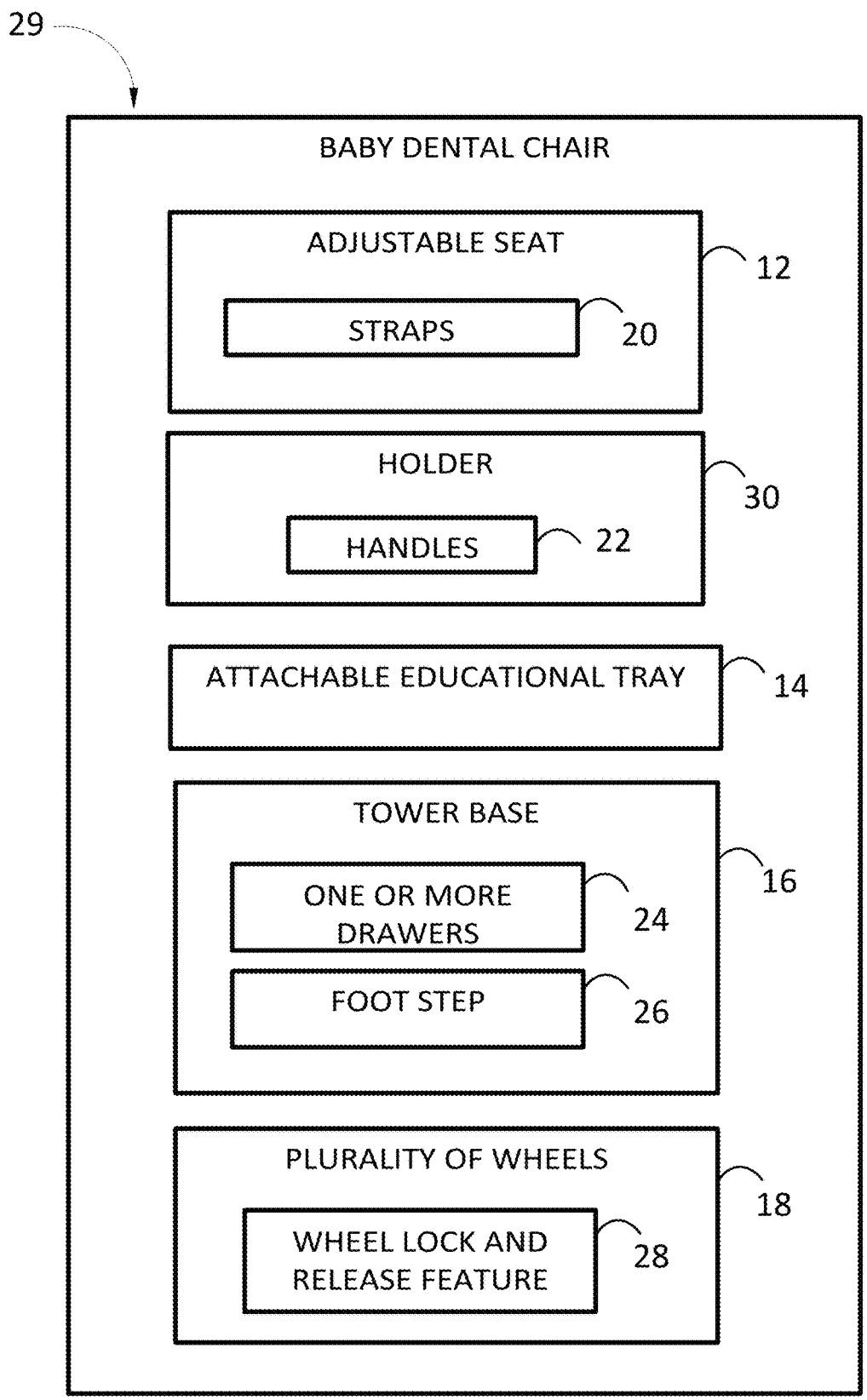
FIG. 3 is a diagrammatic illustration of another baby dental chair, according to one or more embodiments of the present disclosure.

Referring to FIG. 3, another embodiment of the baby dental chair is shown and is generally referred to by reference numeral 29, the baby dental chair 29 according to one or more embodiments is shown in more detail and includes several components of the baby dental chair 10 and thus no further detail will be described.

The baby dental chair 10 includes the baby seat 12, a holder 30, the attachable tray 14, the tower base 16, and the plurality of wheels 18. The baby seat 12 is operably coupled to the holder 30; the holder 30 is operably coupled to the tower base 16; the attachable tray 14 is operably coupled to the holder; and the plurality of wheels 18 are operably coupled to the tower base 16.

In some embodiments, the operable coupling between the baby seat 12 and the holder 30 is effected using, at least in part, bearings such as, for example, ball bearings. In some embodiments, the operable coupling between the baby seat 12 and the holder 30 is effected using, at least in part, bearings, tracks, gears, linkages, or any combination thereof. In some embodiments, the baby seat 12 rotates, swivels, slides, reclines, or any combination thereof relative to the holder 30. In some embodiments, the baby seat 12 tilts back and forth, relative to the holder 30. In some embodiments, the baby seat 12 rotates and/or swivels 360 degrees and tilts back and forth, relative to the holder 30.

In some embodiments the attachable tray 14 is operably coupled to the holder 30. In some embodiments, the attachable tray 14 is releasably connected to the holder 30. In other embodiments, the attachable tray 14 is operably coupled to the tower base 16, rather than the holder 30. In yet another embodiment, the attachable tray 14 is operably coupled to the tower base 16 and the holder 30.

In other embodiments, the handles 22 are operably coupled to the holder 30. In some embodiments, the holder 30 is integrated into the tower base 16. In other embodiments, the holder 30 is a separate component from the tower base 16.

In operation, with continuing reference to FIG. 3, a dentist may move the baby dental chair 29 to the proper location for the dental examination by using the handles 22, attached to the holder 30, and using the plurality of wheels 18. The patient may then be placed in the baby seat 12 and secured by the straps 20. This will allow for the patient to sit in the baby seat 12 well for several minutes without support, experiencing a child-friendly adaptation to dental care. Therefore, the patient child is safe and secure while a proper dental examination occurs. The patient may rest their feet on the foot step 26 to provide further comfort to the young child. The attachable tray 14 is then placed in front of the patient and secured to the tower base 16. The dentist may reach into one or more of the drawers 24 to get dental equipment such as floss, dental instruments, etc.

Figure 4:
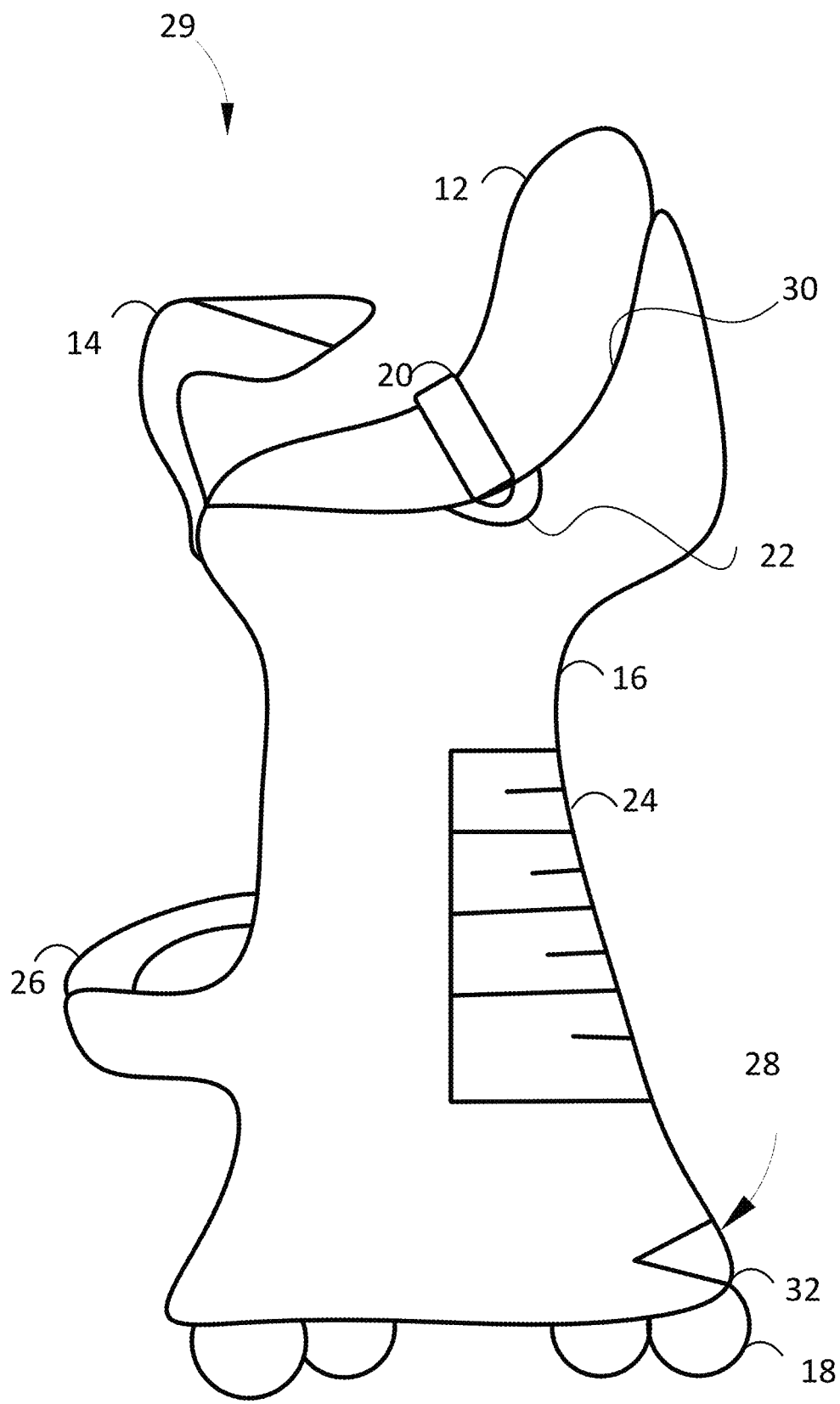
FIG. 4 is a schematic illustration of the baby dental chair of FIG. 3, according to one or more embodiments of the present disclosure.

It is understood that variations may be made to the foregoing without departing from the scope of the invention. For example, referring to FIG. 4, the baby dental chair 29, according to one or more embodiments is shown in more detail and includes an additional feature—a foot-lock 32. The foot-lock 32 is also added to the tower base 16. The foot-lock 32 provides a mechanism to lock or release the wheels. The foot-lock 32 may be in addition to or a replacement of the wheel lock and release feature 28 described in FIG. 1. In some embodiments, the foot-lock 32 is instead a mechanism that indicates that the wheels 18 are locked. In some embodiments, the foot-lock 32 is used in addition to the wheel lock and release feature 28, described in FIG. 1, and the foot-lock 32 indicates that the plurality of wheels 18 are in a locked position.

The dentist steps, presses, or otherwise selects the foot-lock 32 to prevent the plurality of wheels 18 movement. Therefore, the baby dental chair 29 is now immobile and in a fixed position. When the dentist wants to move the baby dental chair 29, the dentist may lift the foot-lock 32 or otherwise select to release the foot-lock 32. The plurality of wheels 18 are then released and able to move.

Figure 5:
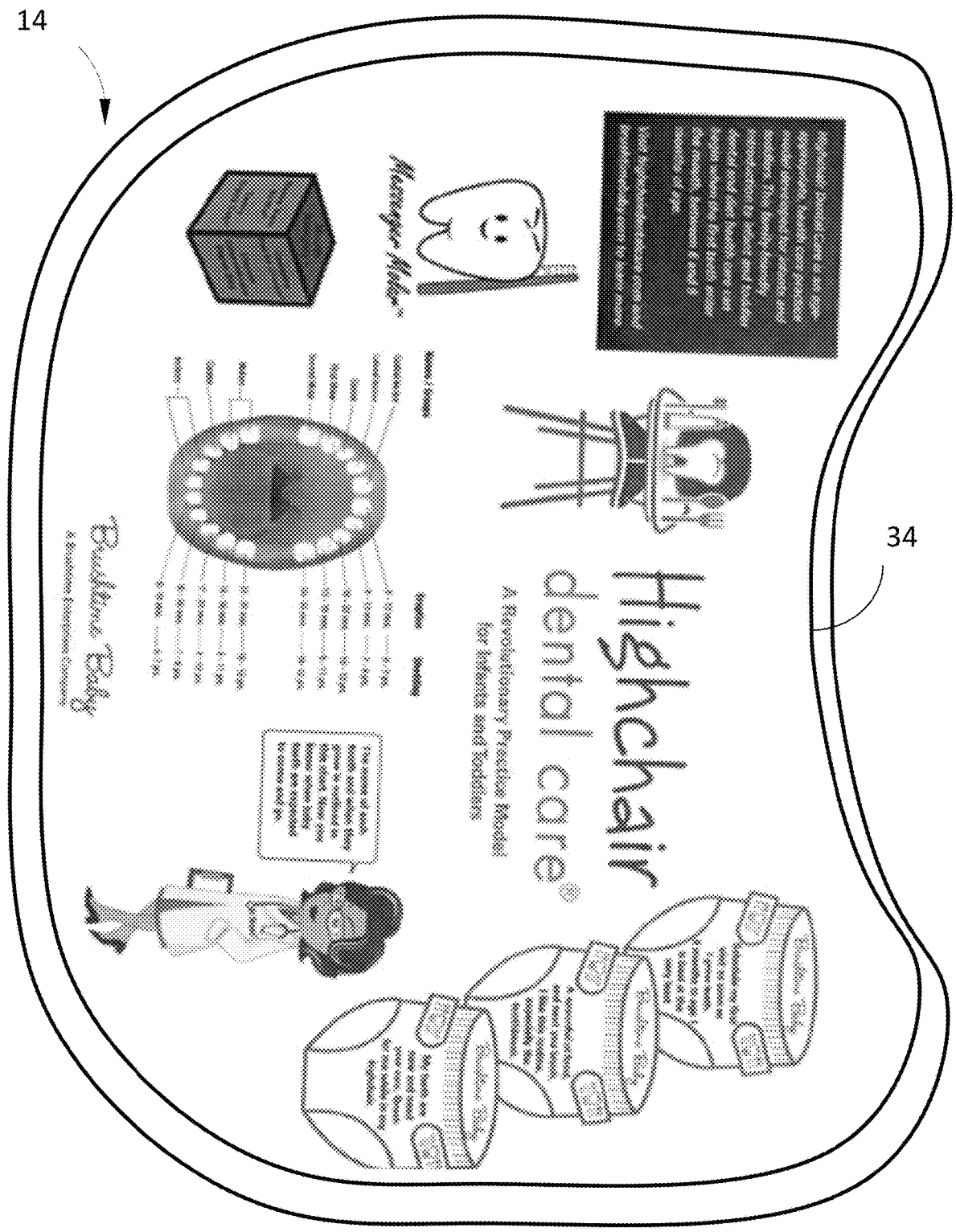
FIG. 5 includes a top view of a tray of the baby dental chair of FIG. 4, according to one or more embodiments of the present disclosure.

Referring to FIG. 5, one embodiment of the attachable tray 14 is shown. FIG. 5 shows an example educational graphic, referred to by reference numeral 34, that may be on the attachable tray 14. The educational graphic 34 may be attachable to the attachable tray 14 and teach and/or provide resources for the parent of the young child regarding educational facts about oral health and dentistry. The educational graphic 34 may come in a variety of languages. In some embodiments, the educational graphic 34 may be etched or otherwise permanently associated with the attachable tray 14. In some embodiments, the educational graphic 34 is removable and may be placed in the attachable tray 14 before each individual dental appointment and/or procedure. In some embodiments, the educational graphic 34 is made of paper or plastic.

Figure 6A:
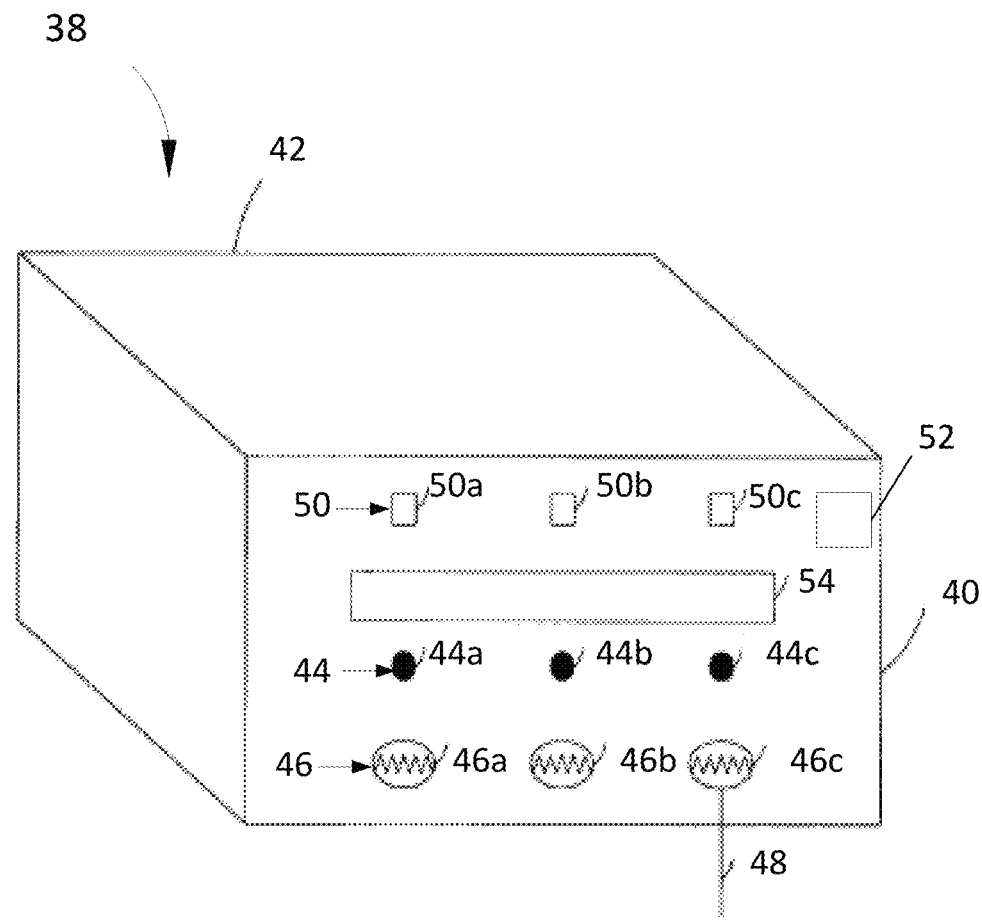
FIG. 6A is an illustration of a floss dispenser, according to one or more embodiments of the present disclosure
Figure 6B:
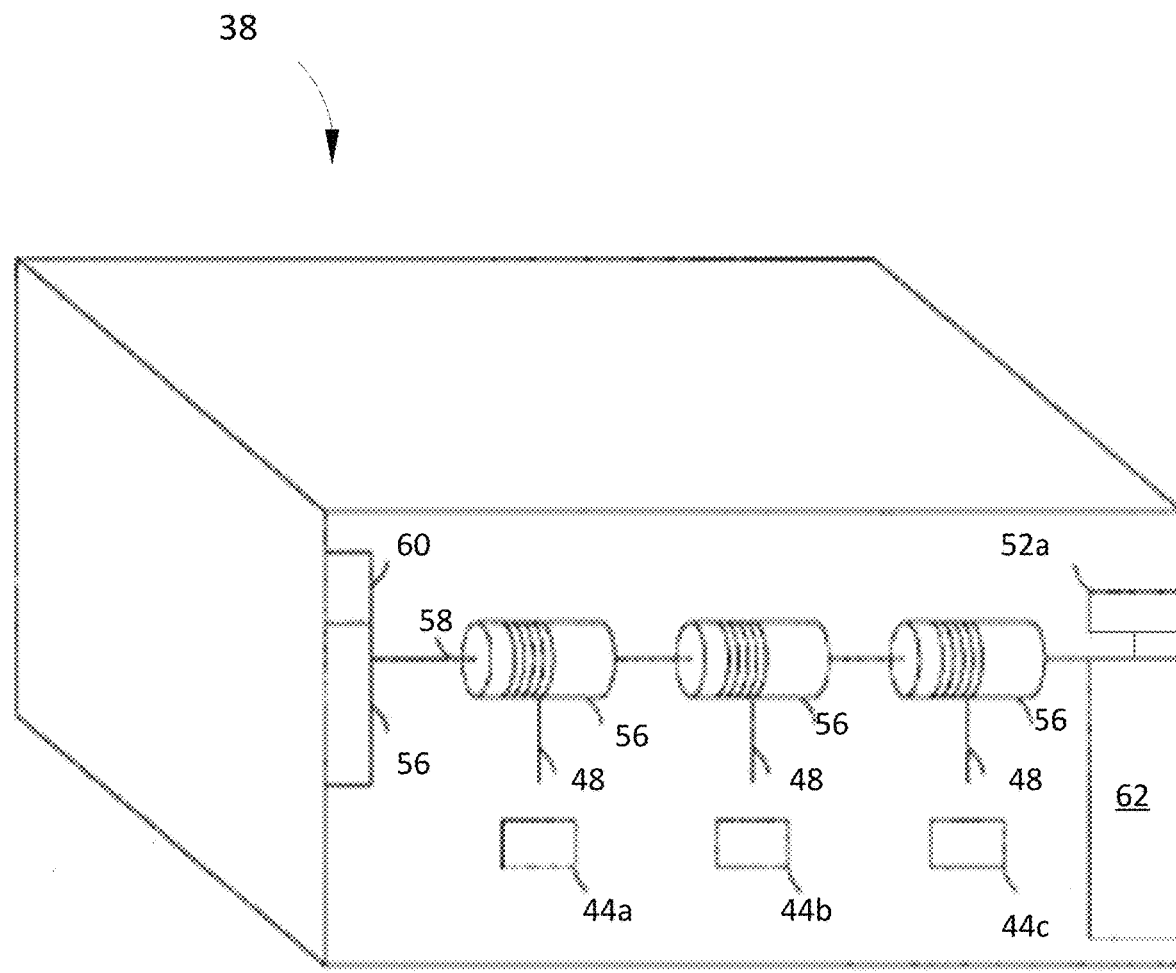
FIG. 6B is another illustration of the floss dispenser, according to one or more embodiments of the present disclosure

Referring to FIGS. 6A and 6B, an automatic, touchless dental floss dispenser 38 is shown. FIG. 6A shows the dispenser 38 with a front cover 40 that is in a closed position. FIG. 6A shows the dispenser 38 including the front cover 40, the housing 42, a sensing mechanism 44, a cutting mechanism 46, dental floss 48, buttons 50, a speaker 52, and a mirror 54.

The sensing mechanism 44 is disposed entirely within the interior space of the housing 42 at a location adjacent to the front cover 40 of the housing 42. The sensing mechanism 44 is oriented toward the front cover 40 of the housing 42 to permit detecting an object contacting the front cover 40. It should be appreciated that any known detection method, such as light, may be used. It is also appreciated that not just any presence adjacent to the front cover 40 will be detected by the sensing mechanism 44, but only one's that clearly reflect an object's attempt to be detected by the sensing mechanism 44, e.g., waving a hand within close proximity to the sensing mechanism 44. A user simply walking by the dispenser 38 would not be sufficient to permit detection of an object. In some embodiments, the user is a patient, and in other embodiments, the user is a dental care professional (such as a dentist or dental hygienist). In some embodiments, such as seen in FIGS. 6A and 6B, there are multiple sensing mechanisms, represented by 44a, 44b, and 44c, respectively in a dispenser 38. In some embodiments, there are more or fewer sensing mechanism(s) 44.

The cutting mechanism 46, in some embodiments, cuts the to the length of 18 inches. In other embodiments, the cutting mechanism 46 cuts the dental floss 48 at a length of 1 foot. In yet other embodiments, the cutting mechanism 46 cuts the dental floss 48 at a length of 6 inches. In some embodiments, the user may select the length of the dental floss 48 to be cut. It should be appreciated that the dispenser can be preset to cut the dental floss at any desired length. In some embodiments, such as shown in FIG. 6B, there are multiple cutting mechanisms, represented by 46a, 46b, and 46c, respectively in a dispenser 38. In some embodiments, there are more or fewer cutting mechanism(s) 46.

The dental floss 48 may be a variety of flavors, sizes, or any other known distinctions in dental floss. In some embodiments, the dental floss is a Cinnamon Apple flavor. In some embodiments, the dental floss is licorice flavored. In some embodiments, the dental floss is simply cinnamon flavored. The selections of flavors for dental floss 48 may be deliberate because cinnamon and licorice have known medicinal benefits and are tasty.

In some embodiments, the buttons 50 may be represented by 50a, 50b, and 50c, respectively, to distinguish three buttons and three options of dental floss 48. The buttons 50a, 50b, and 50c respectively correspond with different types of dental floss 48, mentioned above. In some embodiments, a sensing mechanism 44a, a cutting mechanism 46a, and a button 50a correspond with one type of dental floss 48; a sensing mechanism 44b, a cutting mechanism 46b, and a button 50b correspond with another type of dental floss 48, and a sensing mechanism 44c, a cutting mechanism 46c, and a button 50c correspond with yet another type of dental floss 48. In other embodiments, the buttons 50a, 50b, and 50c do not correspond to a particular cutting mechanism 46 or a particular sensing mechanism 44. In some embodiments, there may be more dental floss 48 options, and in other embodiments, there may be less dental floss 48 options, resulting in more or less buttons.

The speaker 52 is used to play a catchy tune to help encourage people to floss. In some embodiments, the catchy tune that is played over speaker 52 is: "Remember to floss between your teeth to remove old food and icky goo, flossing must do. Your mouth will fell brand new. Now do the floss dance too." In other embodiments, another tune or reminder is played over the speaker 52. In some embodiments, the speaker 52 may be operably coupled to a digital chip 52a. In other embodiments, the speaker 52 includes the digital chip 52a and the digital chip 52a is a sound chip. The speaker is operably connected to the buttons 50, such that when a user presses button 50 to select the dental floss 48, the speaker 52 plays a tune. In other embodiments, the speaker 52 is operably connected to the sensing mechanism 44, such that when the sensing mechanism 44 is activated the speaker 52 plays the pre-recorded tune.

In some embodiments, the mirror 54 is included on the dispenser 38. The mirror may be any reflective surface. The mirror 54, in some embodiments, is a high-gloss, stainless steel. Additionally, the mirror 54 may extend the length of the dispenser 38. In some embodiments, the mirror 54 is made of glass. In some embodiments, the mirror 54 may be formed in a variety of shapes and sizes and may be attached to the dispenser 38.

FIG. 6B shows the dispenser 38 without the front cover 40 to illustrate the internal components of the dispenser 38. The opening of the front cover 40 of the housing 42 allows exposing of the internal components of the dispenser 38 (described below) and resupplying of the dental floss 48 and fixing of any dental floss entanglements. FIG. 6B shows the dispenser 38 without the front cover 40, and includes the features of the sensing mechanism 44, the dental floss 48, a digital chip 52a, a dispensing mechanism 56, a drive roller 58, a monitor 60, and a battery power source 62. FIG. 6B shows the dispenser 38 of FIG. 6A in more detail and includes several components of the dispenser 38 of FIG. 6A, which components are given the same reference numerals and thus no further detail will be described.

The dispensing mechanism 56 is operably coupled to an electric cord or battery power source 62 for powering operation of the dispensing mechanism 56. The dispensing mechanism 56 is disposed within the housing 42. The dispensing mechanism 56 includes a drive roller 58 and a monitor 60. In some embodiments, the dispensing mechanism 56, the drive roller 58, and the monitor 60 are powered by either an electric cord or from the battery power source 62.

The digital chip 52a is located within the housing 42. The digital chip 52a has a pre-recorded song, tune, or message that is stored and may be played over the speaker 52. The digital chip 52a may have more than one message stored (for example, when button 50a is pressed a different song may play then when button 50b is pressed). In some embodiments, when the sensing mechanism 44 is activated the digital chip 52a plays the pre-recorded song, tune, or message.

In operation, with continuing reference to FIGS. 6A and 6B, once the object (such as waiving a hand) is detected, the sensing mechanism 44 signals the dispenser 38 to release a selected strand of dental floss 48. The user selects one of the buttons 50 to pick a type of dental floss 48. Each button 50 corresponds to a certain dispensing mechanism 56, which corresponds with a certain type of dental floss 48. When the user selects the dental floss 48 by pressing button 50, the digital chip 52a is activated and a song plays out of the speaker 52. When the dental floss selection is made, the tune: "Remember to floss between your teeth to remove old food and icky goo, flossing must do. Your mouth will fell brand new. Now do the floss dance too."

To release a selected strand of dental floss, a dispensing mechanism 56 dispenses a predetermined length of dental floss 48. The monitor 60 is engaged with the drive roller 58. As shown in FIG. 6B, dental floss 48 is wound on the dispensing mechanism 56 and fed through a plurality of floss guides (not shown) down to the cutting mechanism 46 where the dental floss 48 extends to the exterior of the housing 42 (as shown in FIG. 6A). Rotation of the dispensing mechanism 56, which is actuated by the drive roller 58 and monitor 60, causes movement of the dental floss 48 in the downward direction. The dispensing mechanism 56 rotates within the housing 42 while dental floss 48 is moving through the floss guides.

Once the dispensing mechanism 56 has dispensed the predetermined length of dental floss, a cutting mechanism 46 within the dispenser 38 automatically severs the dental floss 48 at the predetermined measured length. The predetermined measured length minimizes waste of dental floss. The cutting mechanism 46 cuts the dental floss 48 when the dental floss 48 is extended to the predetermined length. Once the desired predetermined length has been extended, the cutting mechanism 46 is triggered and severs the dental floss 48 at a point between two clamps and cutting edges.

Once severed, the user catches the cut dental floss 48 for use. During use, the dispenser 38 includes a mirror 54 for observing the practice of flossing. Additionally, the housing 42 can have an aperture (not shown) for a receptacle in the dispenser 38 for users to dispose of used lengths of dental floss.

The embodiments of the dispenser 38 described herein provide a number of advantages. For example, the dispenser 38 delivers dental floss 48 in such a manner that unused dental floss will not be contaminated by human hands. Moreover, the dispenser 38 is convenient, safe and easy to use in commercial environments. Such a dispenser 38 can also be mounted in public washrooms, used in private bathrooms, or in dentist and oral hygienist's offices or other convenient and visible location. The dispenser 38 can be conveniently, but not limited to, mounted to a mounting surface. The mounting surface is preferably, but not limited to, vertical.

This system of makes dental floss 48 more available and readily accessible will help to promote better oral hygiene by encouraging the public to practice the routine behavior. Flossing to prevent tooth decay can prevent the inconvenience, expense, and potential discomfort with which it is commonly associated. The dispenser 38 will help to lessen, over time, the oral health care burden placed on the state commerce by helping to reduce the frequency of dental caries that occur between the teeth.

Plaque and food particle that become trapped between the teeth are difficult to reach without flossing. When the process of tooth decay that occurs between the teeth begins it is the most difficult to detect, challenging to treat and more often continues to advance until there is irreversible damage. The use of dental radiographs is necessary to detect interproximal dental caries. This interproximal decay (decay on the smooth surfaces between teeth) requires removal of a significant amount of healthy tooth structure to access the problem areas. Prevention of this type of cavity through flossing can eliminate the destruction of tooth enamel. Any type of tooth decay can lead to the need for fillings but tooth decay between the teeth is especially devastating. This type of tooth destruction can lead to the need for any, or all, of the following dental treatments: root canal therapy, crowns, implants, bridges, partial dentures, complete dentures, and extraction of teeth. The dispenser 38 will help to protect the public by motivating them to have better routine oral health care habits and thus avoiding the pain, suffering and expense brought on by tooth decay that hides between the teeth.

The dispenser 38 increases the motivation to floss routinely with 1) the motivational words of the tune, 2) tasty options of the dental floss 48 dispensed (e.g., Cinnamon Apple and Licorice), 3) the hygienic hands-free feature, and 4) the high gloss, stainless steel, mirror 54 extending the length of the dispenser 38.

Figure 7:
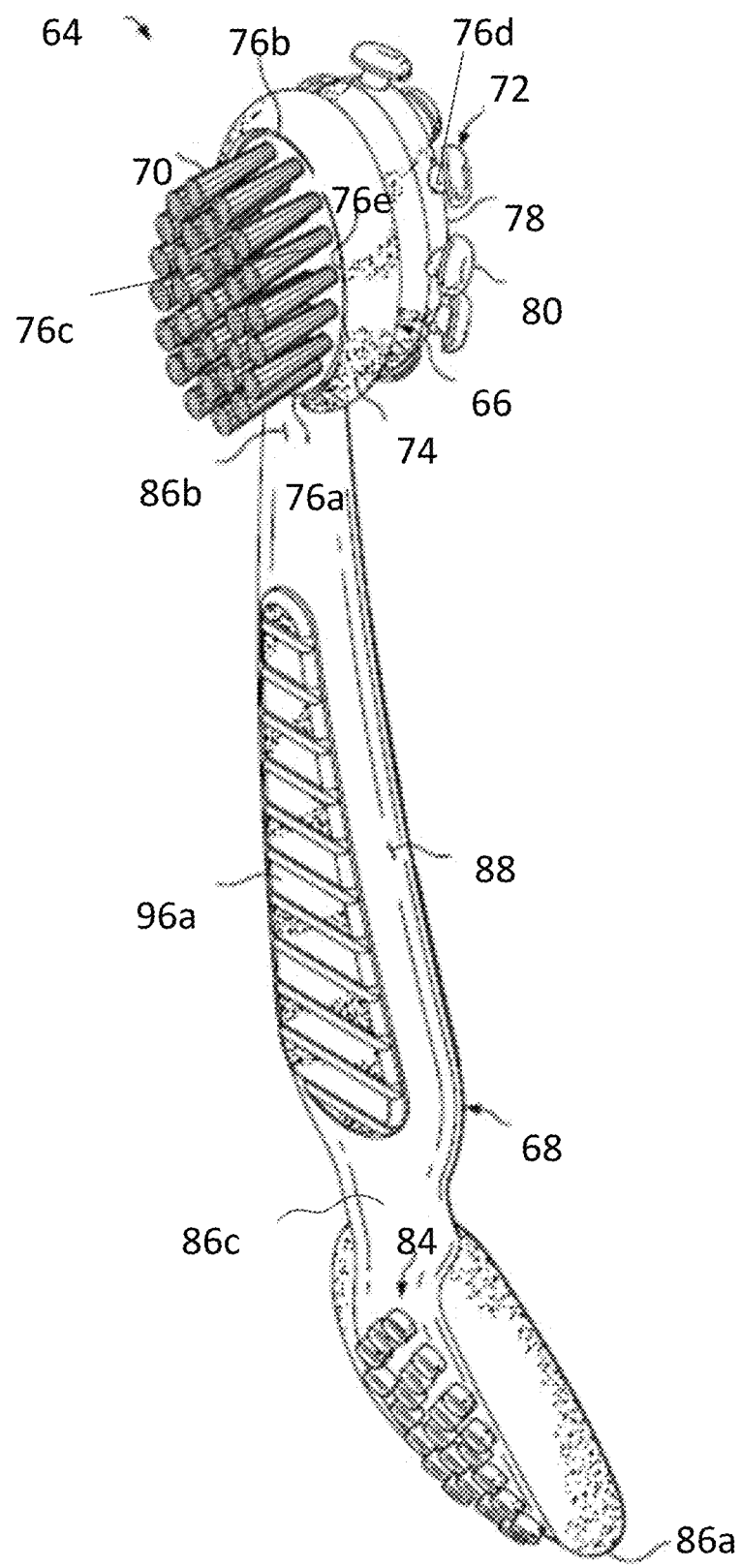
FIG. 7 is a perspective view of a dental care apparatus, according to one or more embodiments of the present disclosure.
Figure 8:
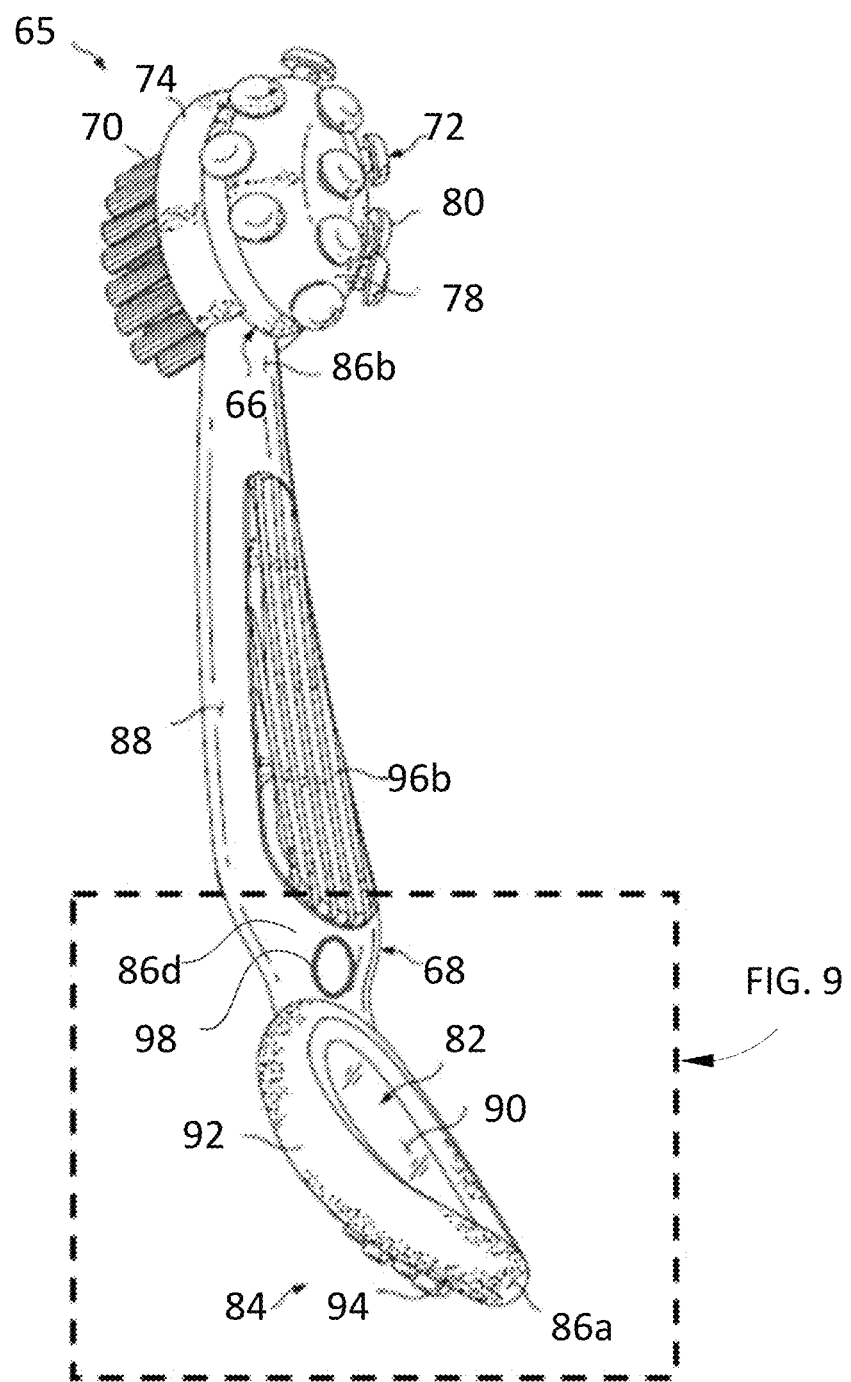
FIG. 8 is another perspective view of the dental care apparatus of FIG. 7, according to one or more embodiments of the present disclosure.

Referring to FIGS. 7 and 8, a dental care apparatus is generally referred to by the reference numeral 64 and 65, respectively, and includes a head 66 and a handle 68. The dental care apparatus 64 has four central parts, two on each end of the handle 68. Moreover, the dental care apparatus 64 has eight unique features that offer at least fourteen uses, as will be described in further detail below. These uses range from brushing the teeth and viewing the dentition to providing nourishment, stimulating oral tissue, and encouraging speech development. The dental care apparatus 64 is enjoyably versatile and addresses many oral care challenges to help improve the human condition. Adults, children, people with disabilities, and aging individuals can all experience the gratifying benefits of using the dental care apparatus 64. The dental care apparatus 64 offers the opportunity to better achieve comprehensive oral health care maintenance and management. The various components of the dental care apparatus 64 are ergonomically developed for effective and efficient routine oral care by adults and children ages 1 and older. The dental care apparatus 64 may be provided in different sizes for the child/toddler and for the youth/adult.

The head 66 includes a brush 70, a massager 72, and a guard 74. The head 66 is oblong. For example, the head 66 may be oval-shaped. The head 66 defines opposing end portions 76a and 76b (shown in FIG. 7), opposing side portions 76c and 76d, and a perimeter portion 76e (shown in FIG. 7). The perimeter portion 76e extends around a periphery of the head 66 between the opposing side portions 76c and 76d. The brush 70 is part of and/or extends from a side portion 76c of the head 66 and includes bristles made of a soft material such as, for example, nylon, vegetable, or the like. In several embodiments, the bristles are antibacterial. The bristles have a length L1. For example, the length L1 may be approximately 1 cm (+/−5%). The bristles of the brush 70 are usable to clean the teeth (e.g., using circular motions for 2 to 3 minutes on all tooth surfaces) and sweep away food particles and/or other residuals from the lips, gums, cheeks, tongue, and/or palate of a user and/or patient. In several embodiments, the dental care apparatus 64 may be designed for a child/toddler, in which case the dental care apparatus weighs approximately 13.5 grams. In several embodiments, the dental care apparatus 64 may be designed for a youth/adult, in which case the dental care apparatus weighs approximately 15.5 grams.

The massager 72 is part of and/or extends from the side opposite the bristles of the head 66 and includes a base 78 and a plurality of projections 80 extending from the base 78, as shown in FIG. 7. In several embodiments, the massager 72 is made of food and/or surgical grade silicone. In several embodiments, the base 78 and the projections 80 are, include, or are part of a single cohesive construction that enables coordination of movement between the base 78 and the projections 80 during use of the dental care apparatus 64. The base 78 is oblong-shaped. In some embodiments, the base 78 may be oval-shaped or dome-shaped. In several embodiments, the base 78 is configured to change in shape in concert with the muscles of facial expression and the muscles of mastication as they contract and relax during use of the dental care apparatus 64. The projections 80 extending from the base 78 each include a stem and a cap. The stem has a dimension D1 (e.g., a diameter), and the cap has a dimension D2 (e.g., a diameter). The dimension D2 is greater than the dimension D1. In several embodiments, the projections 80 are mushroom-shaped. In several embodiments, the projections 80 are injection molded. In several embodiments, the projections 80 are asymmetrically distributed. In several embodiments, the massager 72 has child/toddler and youth/adult sizes. The massager 72 is usable to: stimulate oral tissue throughout the mouth including the lips, gums, cheek, tongue, and/or palate of a user and/or patient to improve food intake, swallowing, and speech; and/or cleanse food debris, fungal patches, microbial film, retained medications, and/or other unwanted materials from the cheek and palate areas (e.g., with gentle circular motions). As a result, the massager 72 helps the patient and/or user to build oral tone and improve a variety of speech, feeding, and sensory skills by expanding the sensory experience inside the oral cavity.

In operation, the head 66 of the dental care apparatus 64 is positioned in the space between the cheeks and the teeth so that the massager 72 extends into the cheeks and the brush 70 contacts the buccal surfaces of the teeth. Once so positioned, a back-and-forth motion is commenced to clean the teeth (using the brush 70) and to clean and stimulate the cheeks (using the massager 72) simultaneously. As the massager 72 cleans and stimulates the cheeks, the base 78 and the projections 80 conform to the anatomical and muscular composition of the cheeks. A level of synchronized mechanics is offered via these muscles in concert with the oblong-shaped head 66 during the act of brushing the teeth or massaging oral tissue. This coordinated movement helps to safely and effectively stimulate blood flow and remove food debris, fungus, and/or residual medications. Specifically, when the back-and-forth motion is commenced, the projections 80 wobble (via the stems and the caps) to aid in the cleaning and stimulation of the cheeks. Such wobbling of the projections 80 improves blood flow to the cheeks, strengthens cheek muscles, and improves deglutition. Salivary flow may also be stimulated by the wobbling of the projections 80 and studies have shown that the promotion of ductal secretions via massage may help to relieve a duct trapped with a salivary stone. In some instances, when the base 78 and the projections 80 are relaxed after conforming to the inside of the cheek, food particles that might otherwise pose a choking hazard are caught between the projections 80 for subsequent removal from the mouth. In addition, the base 78 and the projections 80 can conform to other parts of the mouth (e.g., the durable tissue density and the bony configuration of the hard palate) such that the wobbling of the projections 80 aids in the gentle disruption, collection, and removal of unwanted materials from such other parts of the mouth.

The guard 74 extends along the perimeter portion 80e of the head 66 and serves as a transition to separate the brush 70 and the massager 72. In several embodiments, the guard 74 defines a slight bulge. In several embodiments, the guard 74 is made of food and/or surgical grade silicone. For example, the guard 74 may be or include a cushion-like, circular band of resilient silicone. The guard 74 prevents, or at least reduces, traumatic contact (e.g., hematomas and other soft tissue injuries) between the head 66 and tissues throughout the mouth (e.g., both hard and soft oral structures) during use of the dental care apparatus 64. Specifically, the guard 74 permits only atraumatic tissue contact in the vestibular, retromolar, and cheek areas during use of the dental care apparatus 64. Moreover, the guard 74 reduces the potential for puncture or perforation injuries to the hard and soft palate and the oral pharyngeal structures during cleanings.

The handle 68 includes, is part of, and/or is coupled to an eating utensil 82 (e.g., a spoon, shown in FIG. 8) and a cleaner 84, as shown in FIGS. 7 and 8. The size, shape, and texture(s) of the eating utensil 82 and the cleaner 84, in combination, allows for easy feeding and oral stimulation. More particularly, the eating utensil 82 and the cleaner 84 offer soothing, enjoyable feeding and oral stimulation, affording the dental care apparatus 64 use as an adaptive feeding device, as will be described in further detail below. The handle 68 is ergonomically designed to couple the eating utensil 82 and the cleaner 84 to the head 66. The dental care apparatus 64 has a length L2. For example, the dental care apparatus 64 may be designed for a child/toddler, in which case the length L2 is approximately 15.5 cm (+/−5%). For another example, the dental care apparatus 64 may be designed for a youth/adult, in which case the length L2 is approximately 17.5 cm (+/−5%). In several embodiments, a width of handle 68 is 1.7 cm. In several embodiments, a thickness T of the handle 68 is 600 Mils. In several embodiments, the handle 68 is made of a Plastic #5—Polypropylene (PP).

The handle 68 defines opposing end portions 86a and 86b (shown in FIGS. 7 and 8), opposing side portions 86c and 86d, and a perimeter portion 88 (shown in FIGS. 7 and 8). The perimeter portion 88 extends around a periphery of the handle 68 between the opposing side portions 86c and 86d. The end portion 86b of the handle 68 is connected to the end portion 76a of the head 66. The side portions 86c and 86d of the handle 68 are angularly aligned with the side portions 80c and 80d of the head 66. The handle 68 arches toward the side portion 86d. In several embodiments, the arch of the handle 68 toward the side portion 86d improves access to the mouth using the dental care apparatus 64. Due to the arch of the handle 68 toward the side portion 86d, the opposing end portions 90a and 90b extend at an angle a relative to one another. For example, the angle a may be approximately 170 degrees (+/−5%). For another example, the angle a may be: greater than 145 degrees, 150 degrees, 155 degrees, 160 degrees, or 165 degrees; and less than 175 degrees or 180 degrees. In several embodiments, the angle a offers an increased level of safety by affording the user the ability to grip the handle 68 itself, or to grip the handle 68 and the opposing wider end portion 86a together for added grasp security. As a result, multiple oral tissue areas and surfaces can be both efficiently accessed and effectively maintained using the handle 68 with the incorporation of the applicable and diverse features, as will be described in further detail below. In several embodiments, the angle a supports motor skill versatility by affording safety and effectiveness to cleanse the mouth based on the capabilities of diverse users.

The eating utensil 82 is part of and/or extends from the side portion 90d of the handle 68 at the end portion 86a. In several embodiments, the eating utensil 82 is concave. For example, the eating utensil 82 may have an internal volume of 1 ml. For another example, the eating utensil 82 may have an internal volume of: greater than 0.5 ml, 0.6 ml, 0.7 ml, 0.8 ml, or 0.9 ml; and less than 1.5 ml, 1.4 ml, 1.3 ml, 1.2 ml, or 1.1 ml. In several embodiments, the eating utensil 82 is oblong-shaped. For example, the eating utensil 82 may be oval-shaped. The eating utensil 82 allows small portions of food or medicine to be delivered to the mouth. In several embodiments, the eating utensil 82 prevents, or at least reduces, texture aversions. As will be described in further detail below, the eating utensil 82 is usable as: a feeding spoon to deliver food to the mouth; a dental mirror to visually inspect the mouth; a teething and/or comfort chewing ring; and a mouth prop to assist in opening the mouth when gently placed between the upper and lower teeth.

The eating utensil 82 includes a reflective surface 90 and a bumper rim 92. In several embodiments, the reflective surface 90 is made of stainless steel. The reflective surface 90 of the eating utensil 82 (e.g., a spoon) doubles as a dental mirror that facilitates visibility inside of the mouth for examination of the teeth and oral tissue. In several embodiments, the reflective surface 90 is oblong-shaped to enable inspection of the mouth in both the longitudinal and lateral planes of the eating utensil 82. The bumper rim 92 circumferentially encases the reflective surface 90 and extends along the perimeter portion 88 at the end portion 86a of the handle 68. In several embodiments, the bumper rim 92 is injection molded over the end portion 90a of the handle 68 and around the reflective surface 90. In several embodiments, the bumper rim 92 is made of food and/or surgical grade silicone. The bumper rim 92 extends from the side portion 86c to the side portion 86d of the handle 68 to provide a definitive measure of tissue protection. The bumper rim 92 serves both as a mouth prop and a (de facto) teething/comfort chewing ring (i.e., should teething or comfort chewing occur while in use). However, the bumper rim 92 should be used only to support comfort chewing or teething; should either behavior begin while in use, the dental care apparatus 64 should be promptly and slowly removed from the mouth to avoid injury or aggressive biting/tearing any of the silicone parts. In addition, the bumper rim 92 supports the contents of this shallow spoon and minimizes tooth contact with the end portion 86a of the handle 68 and/or the reflective surface 90 when the dental care apparatus 64 is in use.

The handle 68 also includes a grip 96a that is part of and/or extends from the side portion 86d. The grip 96a extends between the end portions 86a and 86b of the handle 68 and includes longitudinally-extending ridges and grooves. Such longitudinally-extending ridges and grooves prevent, or at least reduce, slippage of the dental care apparatus 64 and possible traumas during use. In several embodiments, the grip 96a is made of food and/or surgical grade rubber. While the primary function of the grip 96a is for grip control of the dental care apparatus 64, the grip 96a can also serve a secondary tongue care function, namely, to clean or stimulate the oral sensory complexes should licking occur.

The cleaner 84 is part of and/or extends from the side portion 86c of the handle 68 at the end portion 86a, as shown in FIG. 7. In several embodiments, the cleaner 84 is oblong-shaped. For example, the cleaner 84 may be oval-shaped. The cleaner 84 includes a plurality of projections 94. In several embodiments, the projections 94 are textured. In several embodiments, the projections 94 are cylinder-shaped. In several embodiments, the projections 94 has child/toddler and youth/adult sizes. In several embodiments, the projections 94 are injection molded. In several embodiments, the projections 94 are made of food and/or surgical grade silicone. The cleaner 84 is usable as: a tongue cleaner if moved back and forth over the tongue to remove food debris, biofilm, and residual medication coating; a taste bud stimulator; an oral sensorimotor stimulator to improve food intake, swallowing, and speech; a tongue depressor; and a cheek retractor to allow access and visibility into the mouth if placed inside the cheek and gently pulled back.

More particularly, the projections 94: support gently cleaning the tongue to reduce the bacterial load harbored by the tongue; serve as an oral/motor stimulator feature capable of stimulating the taste buds, sensory mechanisms, and other oral tissue (such tactile stimulation by the projections 94 can support the transition from pureed food to textured food and provide stability for the tongue); and/or are usable to stimulate the upper lip, the lower lip, the tongue, or any combination thereof. In addition, the cleaner 84 allows for gentle depression (pressure) of the tongue and affords a level of oral motor exercise (OME) that is useful to encourage tongue elevation, tongue lateralization, and tongue bowl maneuvers. These OMEs support masticatory performance and swallow training which are necessary for improved swallowing and speech. The end portion 86a of the handle 68 also allows for retraction of the cheeks and aids in the inspection of the throat and tonsils. The angle a of the handle 68 supports both depression of the tongue and retraction of the cheeks. In addition, the end portion 86a of the handle 68 is usable as a mouth prop when inserted vertically between the upper and lower teeth (anterior or posterior). In this position, the end portion 86a of the handle 68 prevents the mouth from closing and/or affords fastidious maneuvering at the corners of the mouth to facilitate a comfortable and easy entry into the mouth for inspection of the oral cavity, throat, and teeth.

The handle 68 also includes a grip 96b that is part of and/or extends from the side portion 86d, as shown in FIG. 8. The grip 96b extends between the end portions 86a and 86b of the handle 68 and includes longitudinally-extending ridges and grooves. Such longitudinally-extending ridges and grooves prevent, or at least reduce, slippage of the dental care apparatus 64 and possible traumas during use. In several embodiments, the grip 96b is made of food and/or surgical grade rubber. While the primary function of the grip 96b is for grip control of the dental care apparatus 64, the grip 96b can also serve a secondary tongue care function, namely, to clean or stimulate the oral sensory complexes should licking occur.

The handle 68 further includes a light 98. The light 98 is placed in a tilted plane in order to reflect light on the reflective surface 90. In some embodiments the light 98 is recessed into the stem of the handle 68. In some embodiments, the light 98 reflects off of a stainless-steel surface of the dental care apparatus 64. In some embodiments, the light 98 is placed in a recess or bulb cavity. The recess, where the light 98 is placed, in some embodiments, is designed to be reminiscent of the shape of the reflective surface 90 to evenly distribute light on the entire reflective surface 90.

Figure 9:
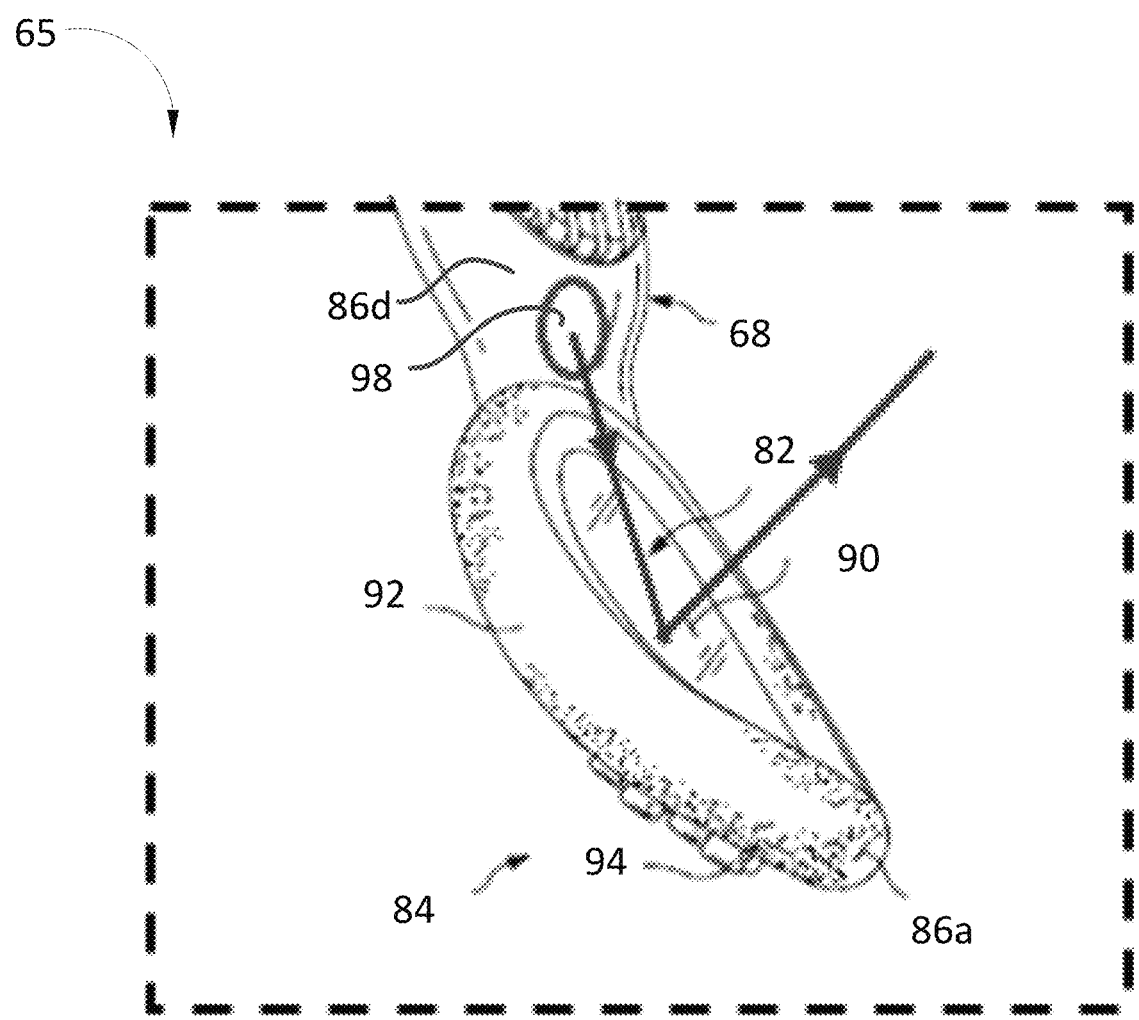
FIG. 9 is a portion of the perspective view of the dental care apparatus of FIG. 8, according to one or more embodiments of the present disclosure.

In operation, with further reference to FIG. 9, the light 98 is activated by solar energy after a few seconds of exposure (for example, placing the light 98 under a lamp, lantern, or flashlight) and remains illuminated for a few seconds to allow for an inspection of the patient's mouth or throat. As seen in FIG. 9, the light 98 emits light which is reflected by the reflected surface 90 away from the dental care apparatus 64, specifically the reflective surface 90, enabling the user or dentist to see the teeth being examined in the reflective surface 90.

In some embodiments, the light 98 is battery operated.

In several embodiments, the massager 72 and/or the cleaner 84 is/are also usable to: clean dental appliances (e.g., acrylic appliances) by removing food without scratching or otherwise damaging the appliance. The massager 72 is especially efficient in cleansing appliances that conform to the shape of the palate such as complete dentures, obturators, and other removable adult, pediatric, and orthodontic appliances. Specifically, hard-to-reach areas where bacteria collect can be efficiently cleansed using the massager 72. Moreover, the silicone material from which the massager 72 and/or the cleaner 84 is/are made prevents, or at least reduces, damage to such dental appliances, unlike toothbrush bristles which can damage and scratch acrylics.

As discussed herein, the dental care apparatus 64 of FIGS. 7, 8, and 9 enables at least the following operational features/components: hand grips, an eating utensil, a dental mirror, a teething/comfort chewing ring, a mouth prop, a tongue cleaner, a tongue depressor, a cheek retractor, an adaptive feeding device, an oral/motor stimulator, a toothbrush, a tissue guard, a tissue massager, a light, and/or an appliance cleaner. Each of these different features/components can stand alone independently but can also be used together for the general purpose of comprehensive oral health management. Thus, the dental care apparatus 64 offers dynamic functional uses on both end portions 76a and 76b of the head 66 and both side portions 86c and 86d of the handle 68, which uses have been methodically developed to help execute the fundamentals of good oral health maintenance. In some instances, the dental care apparatus 64 can decrease oral defensiveness and improve tolerance of food textures in the mouth.

Since the dental care apparatus 64 offers an opportunity to better achieve comprehensive oral health care maintenance and management, adults, children, special needs individuals, and aging individuals can all experience measurable benefits using the dental care apparatus 64. However, children, persons with special needs, and/or infirmed or elderly persons should never be left unattended when oral hygiene care is being addressed and must always be supervised when using the dental care apparatus 64. The various features/components of the dental care apparatus 64 are ergonomically configured for an effective and efficient or health care routine. Specifically, the ergonomic design of the dental care apparatus 64 is intended to provide improved levels of comprehensive oral health management and maintenance for adults, infants as young as eight (8) months old, toddlers, special needs persons, and/or persons with infirmities (e.g., elderly persons).

Finally, so many circumstances exist inside of the mouth that support the usefulness of the design elements of the dental care apparatus 64. The versatility and varied functions can be especially helpful for babies, adults and other patient populations. The (1) elderly, (2) immunosuppressed, (3) facial burn victims, (4) Bell's Palsy patient, (5) individuals with craniofacial syndromes, (6) ventilated patients, (7) post-ventilated patients, (8) patients recovering from oral surgery or broken jaw fixation appliances, and (9) others who may be disabled can all reap the many benefits of improved oral health maintenance using the dental care apparatus 64. A healthy mouth is not just about the teeth. It is about diet, eating, swallowing, speaking, health maintenance, and health education. The functionally-diverse dental care apparatus 64 provides for oral health care education, maintenance, and management. The teeth, tongue, cheeks, palate and gingiva can all be easily and efficiently cleaned, swallowing exercised, speech development assisted, and oral appliances preserved safely and effectively using the dental care apparatus 64. The dental care apparatus 64 is an age-appropriate and circumstances-appropriate oral health care product that provides the opportunity to promote healthy behaviors at the point of care.

It is understood that variations may be made in the foregoing without departing from the scope of the present disclosure.

A first apparatus has been disclosed. The first apparatus generally includes: a tower base, wherein the tower base has opposing upper and lower end portions, opposing first and second side portions, and opposing third and fourth side portions; and wherein the tower base includes one or more drawers; a seat, wherein the seat is coupled to the upper end portion of the tower base; wherein the seat is constructed out of a plastic; wherein the seat is sized to fit a dental patient; and wherein the dental patient is a young child or infant; wherein at least a portion of the seat adjusts between at least three positions; wherein a first position defines a generally right angle between a horizontal line and a back portion of the seat; wherein a second position defines a generally acute angle between the horizontal line and the back portion of the seat; and wherein a third position defines when the back portion of the seat is generally flush with the horizontal line; and a plurality of wheels; wherein the plurality of wheels are operably coupled to the lower end portion of the tower base; wherein at least one wheel of the plurality of wheels has a wheel locked configuration and a wheel released configuration; wherein when in the wheel locked configuration, the at least one wheel of the plurality of wheels is prevented from turning; and wherein when in the wheel released configuration, the at least one wheel of the plurality of wheels is allowed to move freely. In some embodiments, when the dental patient sits in the seat, the at least one wheel of the plurality of wheels changes from the wheel released configuration to the wheel locked configuration; and weight of the dental patient activates the wheel locked configuration and causes the at least one wheel of the plurality of wheels to retract into a recess in the lower end portion of the tower base. In one or more embodiments, when the dental patient is removed from the seat, the at least one wheel of the plurality of wheels returns to the wheel released configuration. In one or more embodiments, the first apparatus includes a foot lock located closer to the lower end portion of the tower base than the upper end portion of the tower base; and the foot lock when pressed locks the at least one wheel of the plurality of wheels to prevent movement. In some embodiments, when the dental patient sits in the seat of the dental care apparatus, the lower end portion of the tower base slides down over the at least one wheel of the plurality of wheels to prevent movement; when a foot lock is pressed the at least one wheel of the plurality of wheels is locked in place; and when the dental patient sits in the seat of the dental care apparatus, the foot lock indicates that the at least one wheel of the plurality of wheels is locked. In some embodiments, the first apparatus includes a first notch being engaged with a portion of the seat moves the seat into the first position. In one or more embodiments, the first apparatus includes one or more straps, wherein the one or more straps secure the dental patient in the seat; one or more handles, wherein the one or more handles are coupled to the tower base and are closer to the upper end portion of the tower base than the lower end portion of the tower base, and an educational tray, wherein the educational tray is removable from the dental care apparatus; and wherein the educational tray is attachable to the tower base. In one or more embodiments, the first apparatus includes an educational tray, wherein the educational tray is operably coupled to the third side portion of the tower base; and wherein the one or more drawers are located on the third side portion of the tower base; and wherein the one or more drawers are configured to store dental equipment and provide access to the dental equipment while the dental patient is seated in the seat. In some embodiments, the first apparatus includes an educational tray, wherein the educational tray is operably coupled to the third side portion of the tower base; and wherein the one or more drawers are located on the fourth side portion of the tower base. In some embodiments, the first apparatus includes a holder, wherein the holder is coupled to the upper end portion of the tower base; wherein the seat includes a top portion and a bottom portion; wherein the top portion is opposite the bottom portion; and wherein the holder is further coupled to the bottom portion of the seat.

A second apparatus has also been disclosed. The second apparatus generally includes: a tower base, wherein the tower base has opposing upper and lower end portions, opposing first and second side portions, and opposing third and fourth side portions; and wherein the tower base includes one or more drawers; a seat, wherein the seat includes a top portion and a bottom portion; wherein the top portion is opposite the bottom portion; wherein the seat is constructed out of a plastic; wherein the seat is sized to fit a dental patient; wherein the dental patient is a young child or an infant; a holder, wherein the holder is coupled to the upper end portion of the tower base and the bottom portion of the seat; and a plurality of wheels; wherein the plurality of wheels are operably coupled to the lower end portion of the tower base; and wherein at least one wheel of the plurality of wheels has a wheel locked configuration and a wheel released configuration; wherein when in the wheel locked configuration, the at least one wheel of the plurality of wheels is prevented from turning; and wherein when in the wheel released configuration, the at least one wheel of the plurality of wheels are allowed to move freely. In one or more embodiments, when the dental patient sits in the seat, the at least one wheel of the plurality of wheels changes from the wheel released configuration to the wheel locked configuration; and weight of the dental patient activates the wheel locked configuration and causes the at least one wheel of the plurality of wheels to retract into a recess in the lower end portion of the tower base. In one or more embodiments, when the dental patient is removed from the seat, the at least one wheel of the plurality of wheels returns to the wheel released configuration. In some embodiments, the second apparatus includes: a foot lock located closer to the lower end portion of the tower base than the upper end portion of the tower base; and wherein the foot lock when pressed locks at least one wheel of the plurality of wheels to prevent movement. In one or more embodiments, when the dental patient sits in the seat of the dental care apparatus, the lower end portion of the tower base slides down over the at least one wheel of the plurality of wheels to prevent movement; wherein when a foot lock is pressed the at least one wheel of the plurality of wheels is locked in place; and wherein when the dental patient sits in the seat of the dental care apparatus, the foot lock indicates that at least one wheel of the plurality of wheels is locked. In some embodiments, at least a portion of the seat adjusts between at least three positions; wherein a first position defines a generally right angle between a horizontal line and a back portion of the seat; wherein a second position defines a generally acute angle between the horizontal line and the back portion of the seat; and wherein a third position defines when the back portion of the seat is generally flush with the horizontal line. In some embodiments, the second apparatus includes a first notch being engaged with a portion of the seat moves the seat into the first position. In one or more embodiments, the one or more drawers are located on the fourth side portion of the tower base.

A third apparatus has also been disclosed. The third apparatus generally includes: a tower base, wherein the tower base has opposing upper and lower end portions, opposing first and second side portions, and opposing third and fourth side portions; and wherein the tower base includes one or more drawers; wherein the upper end portion of the tower base is a holder; an educational tray, wherein the educational tray is attachable to the tower base; a seat, wherein the seat includes a top portion of the seat and a bottom portion of the seat; wherein the top portion of the seat is opposite the bottom portion of the seat; wherein the bottom portion of the seat is operably coupled to a holder of the tower base; wherein the seat is constructed out of a plastic; wherein the seat is sized to fit a dental patient; wherein the dental patient is a young child or an infant; wherein at least a portion of the seat adjusts between at least three positions; wherein a first position defines a generally right angle between a horizontal line and a back portion of the seat; wherein a second position defines a generally acute angle between the horizontal line and the back portion of the seat; and wherein a third position defines when the back portion of the seat is generally flush to the horizontal line; one or more straps, wherein the one or more straps secure the dental patient in the seat; one or more handles, wherein the one or more handles are coupled to the upper portion of the tower base; and a plurality of wheels; wherein the plurality of wheels are operably coupled to the lower end portion of the tower base; and wherein at least one wheel of the plurality of wheels has a wheel locked configuration and a wheel released configuration; wherein when in the wheel locked configuration, the at least one wheel of the plurality of wheels is prevented from turning; wherein when in the wheel released configuration, the at least one wheel of the plurality of wheels are allowed to move freely; and wherein the wheel locked configuration occurs either when the dental patient sits in the seat of the dental care apparatus, the lower end portion of the tower base slides down over the at least one wheel of the plurality of wheels to prevent movement or when a foot lock is pressed the at least one wheel of the plurality of wheels is locked in place.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A dental care apparatus, comprising:
   a tower base,
      wherein the tower base has opposing upper and lower end portions, opposing first and second side portions, and opposing third and fourth side portions;
   a seat,
      wherein the seat includes a top portion and a bottom portion;
      wherein the top portion is opposite the bottom portion,
      wherein the seat is constructed out of a plastic;
      wherein the seat is sized to fit a dental patient;
      wherein the dental patient is a young child or an infant:
   a holder,
      wherein the holder is coupled to the upper end portion of the tower base and the bottom portion of the seat;
   and
   plurality of wheels;
      wherein the plurality of wheels are operably coupled to the lower end portion of the tower base; and
      wherein at least one wheel of the plurality of wheels has a wheel locked configuration and a wheel released configuration;
      wherein when in the wheel locked configuration, the at least one wheel of the plurality of wheels is prevented from turning; and
      wherein when in the wheel released configuration, the at least one wheel of the plurality of wheels are allowed to move freely;
      wherein when the dental patient sits in the seat, the at least one wheel of the plurality of wheels changes from the wheel released configuration to the wheel locked configuration; and
      wherein weight of the dental patient activates the wheel locked configuration and causes the at least one wheel of the plurality of wheels to retract into a recess in the lower end portion of the tower base.

2. The dental care apparatus of claim 1, wherein when the dental patient is removed from the seat, the at least one wheel of the plurality of wheels returns to the wheel released configuration.

3. The dental care apparatus of claim 1, wherein the tower base includes one or more drawers.

4. A dental care apparatus, comprising:
   a tower base,
      wherein the tower base has opposing upper and lower end portions, opposing first and second side portions, and opposing third and fourth side portions;
   a seat,
      wherein the seat includes a top portion and a bottom portion;
      wherein the top portion is opposite the bottom portion,
      wherein the seat is constructed out of a plastic;
      wherein the seat is sized to fit a dental patient;
      wherein the dental patient is a young child or an infant:
   a holder,
      wherein the holder is coupled to the upper end portion of the tower base and the bottom portion of the seat;
   and
   a plurality of wheels;
      wherein the plurality of wheels are operably coupled to the lower end portion of the tower base; and
      wherein at least one wheel of the plurality of wheels has a wheel locked configuration and a wheel released configuration;
      wherein when in the wheel locked configuration, the at least one wheel of the plurality of wheels is prevented from turning;
      and
      wherein when in the wheel released configuration, the at least one wheel of the plurality of wheels are allowed to move freely;
   wherein the dental care apparatus further comprises:
   a foot lock located closer to the lower end portion of the tower base than the upper end portion of the tower base; and wherein the foot lock when pressed locks at least one wheel of the plurality of wheels to prevent movement.

5. The dental care apparatus of claim 4, wherein the tower base includes one or more drawers.

6. A dental care apparatus, comprising:
   a tower base,
      wherein the tower base has opposing upper and lower end portions, opposing first and second side portions, and opposing third and fourth side portions;
   a seat,
      wherein the seat includes a top portion and a bottom portion;
      wherein the top portion is opposite the bottom portion,
      wherein the seat is constructed out of a plastic;
      wherein the seat is sized to fit a dental patient; wherein the dental patient is a young child or an infant:
   a holder,
      wherein the holder is coupled to the upper end portion of the tower base and the bottom portion of the seat;
   and
   a plurality of wheels;
      wherein the plurality of wheels are operably coupled to the lower end portion of the tower base; and
      wherein at least one wheel of the plurality of wheels has a wheel locked configuration and a wheel released configuration;
      wherein when in the wheel locked configuration, the at least one wheel of the plurality of wheels is prevented from turning;
      and
      wherein when in the wheel released configuration, the at least one wheel of the plurality of wheels are allowed to move freely;
      wherein when the dental patient sits in the seat of the dental care apparatus, the lower end portion of the tower base slides down over the at least one wheel of the plurality of wheels to prevent movement;
      wherein when a foot lock is pressed the at least one wheel of the plurality of wheels is locked in place; and
      wherein when the dental patient sits in the seat of the dental care apparatus, the foot lock indicates that at least one wheel of the plurality of wheels is locked.

7. The dental care apparatus of claim 6, wherein the tower base includes one or more drawers.

8. A dental care apparatus, comprising:
a tower base,
   wherein the tower base has opposing upper and lower end portions, opposing first and second side portions, and opposing third and fourth side portions;
a seat,
   wherein the seat includes a top portion and a bottom portion;
   wherein the top portion is opposite the bottom portion,
   wherein the seat is constructed out of a plastic;
   wherein the seat is sized to fit a dental patient;
   wherein the dental patient is a young child or an infant:
a holder,
   wherein the holder is coupled to the upper end portion of the tower base and the bottom portion of the seat;
   and
a plurality of wheels;
   wherein the plurality of wheels are operably coupled to the lower end portion of the tower base; and
   wherein at least one wheel of the plurality of wheels has a wheel locked configuration and a wheel released configuration;
   wherein when in the wheel locked configuration, the at least one wheel of the plurality of wheels is prevented from turning;
   and
   wherein when in the wheel released configuration, the at least one wheel of the plurality of wheels are allowed to move freely;
wherein dental care apparatus further comprises:
one or more straps,
   wherein the one or more straps secure the dental patient in the seat; one or more handles,
   wherein the one or more handles are coupled to the holder:
   and
an educational tray,
   wherein the educational tray is removable from the dental care apparatus;
   and
   wherein the educational tray is attachable to the tower base.

9. The dental care apparatus of claim 8, wherein the tower base includes one or more drawers.

* * * * *